(12) United States Patent
Deppe et al.

(10) Patent No.: US 7,731,370 B2
(45) Date of Patent: Jun. 8, 2010

(54) PROJECTION SYSTEM AND METHOD FOR OPERATING A DISCHARGE LAMP

(75) Inventors: Carsten Deppe, Aachen (DE); Tom Munters, Hasselt (BE)

(73) Assignee: Koninklijke Philips Electronics, N.V., Eindhoven (NL)

( * ) Notice: Subject to any disclaimer, the term of this patent is extended or adjusted under 35 U.S.C. 154(b) by 502 days.

(21) Appl. No.: 11/719,771

(22) PCT Filed: Nov. 21, 2005

(86) PCT No.: PCT/IB2005/053833

§ 371 (c)(1),
(2), (4) Date: May 21, 2007

(87) PCT Pub. No.: WO2006/056526

PCT Pub. Date: Jun. 1, 2006

(65) Prior Publication Data

US 2009/0147223 A1    Jun. 11, 2009

(30) Foreign Application Priority Data

Nov. 24, 2004  (EP) .................................. 04106026

(51) Int. Cl.
*G03B 21/20*     (2006.01)
*G05F 1/00*      (2006.01)
*H05B 37/02*     (2006.01)
*H05B 39/04*     (2006.01)
*H05B 41/36*     (2006.01)

(52) U.S. Cl. ........................................ 353/85; 315/291

(58) Field of Classification Search ................... 353/85, 353/84, 121; 348/742, 743, 771; 345/53; 315/291
See application file for complete search history.

(56) References Cited

U.S. PATENT DOCUMENTS 6,377,236 B1    4/2002   Karamoto
(Continued)

FOREIGN PATENT DOCUMENTS

DE         10319571 A1   11/2004
(Continued)

OTHER PUBLICATIONS

Florian et al.; DE 10319571; Machine Translation from German to English.*

*Primary Examiner*—Georgia Y Epps
*Assistant Examiner*—Ryan Howard

(57) ABSTRACT

A projection system and a method for operating a discharge lamp are described. The protection system comprises a discharge lamp 12 and driving electronics 14. The color wheel 18 serves as color filter for filtering light 16 emitted from lamp 12 to generate a light sequence 20 with different colors in sequential color time periods 22, 22a. In between color time periods 22, 22a, spoke time periods 24, 24a are arranged. The driving electronics provide a lamp current I with superimposed first current pulses, which are generated in at least one of the color time periods 22, 22a. In order to allow greater flexibility and be able to achieve stable arc operation and constant color point over lamp lifetime, the driving electronics 14 further provide second current pulses superimposed on the lamp current. The second current pulses are generated during at least one of the spoke time periods 24, 24a.

6 Claims, 2 Drawing Sheets

U.S. PATENT DOCUMENTS

| | | | |
|---|---|---|---|
| 6,400,511 B2 * | 6/2002 | Vanlier et al. | 359/634 |
| 2001/0022692 A1 | 9/2001 | Vanlier et al. | |
| 2002/0176055 A1 | 11/2002 | De Vaan et al. | |

FOREIGN PATENT DOCUMENTS

| | | | |
|---|---|---|---|
| EP | 1154652 A2 | 11/2001 | |
| WO | WO03096760 A1 | 11/2003 | |
| WO | WO2004016000 A1 | 2/2004 | |
| WO | WO2004052023 A1 | 6/2004 | |
| WO | WO2004064409 A1 | 7/2004 | |

* cited by examiner

PROJECTION SYSTEM AND METHOD FOR OPERATING A DISCHARGE LAMP

The invention relates to a projection system and a method for operating a discharge lamp.

Projection systems are known, where a lamp, preferably a discharge lamp, generates the light used for projection. The light is color modulated, i.e. a time and/or space sequential color sequence is generated. This color modulated light is fed to a light valve, e.g. a DMD (digital mirror device) or a transmissive or reflective LCD device.

Generally, for the light output needed by projection systems it is preferable to use discharge lamps driven by alternating currents. In this case, to stabilize the arc it is known to use current pulses. These pulses serve to effectively prevent arc jumping. However, as a disadvantage, the current pulses lead to an uneven light emission over time and thus may produce color artifacts in projection systems with time sequential color display.

This problem is further complicated by the lifetime behavior of a discharge lamp. Generally, over lifetime the electrical properties change. Usually the lamp voltage increases due to electrode burn-back. In order to keep the electrical operating power constant, the lamp current needs to be reduced accordingly.

EP-A-1 154 652 describes a projection system. A high intensity discharge (HID) lamp is operated with an alternating current. A color wheel serves for color-modulating the light emitted from the HID lamp. The color wheel comprises segments of filters for different colors. As the color wheel turns in the light path, light is generated with different colors in sequential color time periods. In the projection system of EP-A-1 154 652 current pulses are superimposed on the alternating lamp driving current to stabilize the arc. In order to compensate for the effect of these current pulses and to preserve color balance of the system, each of the current pulses is generated in one of the color time periods.

A disadvantage arising from this mode of operation is that while over lifetime the average lamp current decreases, the current amplitude needed to stabilize the arc is fixed. Thus, while the color balance might be well adjusted at an early stage of the lamp lifetime, there is a noticeable color shift over time due to an increased amount of light generated during the color segment with the current pulse. The operating mode is too inflexible to compensate for such a shift.

It the object of the present invention to provide a projection system and a method of operating a discharge lamp which are flexible enough to be able to improve the color balance stability over lifetime.

This object is achieved by a projections system according to claim 1 and a method of operating a discharge lamp according to claim 8. Dependent claims refer to preferred embodiments of the invention.

According to the invention, the color filter means, e.g. a color wheel, generate a light sequence. Within this light sequence are color time periods, where it is preferred for the light to be of constant color throughout the individual color time period. Color time periods of different colors are arranged sequentially, generally periodically. In between color time periods, spoke time periods are arranged. Preferably, spoke time periods are chosen such that within the spoke time periods the light is of non-constant color. If a color wheel or comparable sequential filter means is used, the spoke time periods incorporate the transition from one constant color time period to another, so that within spoke time periods the light is of non-constant color. Spoke times are preferably defined to be as short as possible, usually considerably shorter than constant color time periods. The light generated during spoke time periods cannot be used to generate a color image. It may be either blocked completely or be used to brighten the total projected image, without regard to color.

Within the light sequence described above, the driving means generate current pulses to stabilize the arc. First current pulses are generated and superimposed on the basic lamp current. The basic lamp current may be an alternating current, but also a direct lamp current may be used. Here, each of the first current pulses is generated in one of the color time periods. The current pulse may be active during the complete duration of the color time period, or only during a fraction of the color time period. However, also second current pulses are generated and also superimposed on the basic current. The second current pulses are generated during spoke time periods.

There are several advantages to driving a discharge lamp with both first and second current pulses superimposed on the alternating current. Using two types of current pulses in the same half period of the alternating current allows a very flexible approach to arc stabilization. Also for lamps driven with a direct current, there are advantages for arc stabilization.

In the case of a lamp driven by an alternating current it is particularly preferred for the second current pulse to start, within the same half period of the alternating current, after the start of the first current pulse. Also, in the case of an alternating current it is preferred for both the first and the second current pulse to be generated shortly before polarity change, and most preferably to continue until the polarity change.

Also, preferably the second current pulse has a shorter duration than the first current pulse. Since the effect of arc stabilization can be seen as heating the electrodes, especially before polarity change in the case of an alternating current, the second current pulse, if it is closer to the polarity change, will have a significant effect on arc stabilization, even if it has considerably shorter duration than the first current pulse.

Further, it is advantageous that the second current pulse is generated during a spoke time period. While the first current pulse is generated during a color time period, and therefore plays an important role in the total projection system color balance, the second current pulse generated during a spoke time period does not significantly influence color balance. This is, because spoke time periods are usually not used to generate an image of a specific color.

According to a further development of the invention, the amplitude of the first current pulse is chosen in fixed relation to the mean current. While in prior art systems, only current pulses of fixed amplitude (i.e. the amplitude required for arc stabilization) were generated, it is now proposed to choose the amplitude of the first current pulse in relation to the mean current (i.e. the mean current within the half period, without the current pulses) such that the ratio of light output between the two is essentially constant. If in a given lamp the light output is (to an acceptable degree of precision) directly proportional to electrical power, this may very easily be achieved when calculating the amplitude of the first current pulse by multiplying the mean current with fixed factor. In the case of a more complex behavior of light output in relation to electrical power, or if greater color precision is required, an internal lookup table inside the driving means may be employed to calculate the amplitude of the first current pulse such as to achieve a constant light output ratio.

By choosing the first current pulse in relation to the mean current, a color shift over lifetime is avoided. The color time interval with the first current pulse will always contribute a constant fraction of the total light generated. If over lifetime the mean current is adjusted due to electrical changes (increasing lamp voltage over lifetime), the first current pulse amplitude is then automatically adjusted accordingly. Thus, color shift over lifetime due to the first current pulse is eliminated.

On the other hand, the second current pulse generated during spoke time periods has none or very little influence on color balance. Thus, the amplitude of the second current pulse may be chosen to achieve good arc stabilization without regard to color balance. Specifically, the amplitude of the second current pulse may be chosen such that an essentially fixed value of the lamp current is reached. This fixed value remains constant. Alternatively, the amplitude of the second current pulse may be chosen to be of a predetermined value, which can be taken from a lookup table, to ensure sufficient pulse amplitude for good arc stabilization.

In the following, an embodiment of the invention is described with regard to the drawings.

Figure 1:
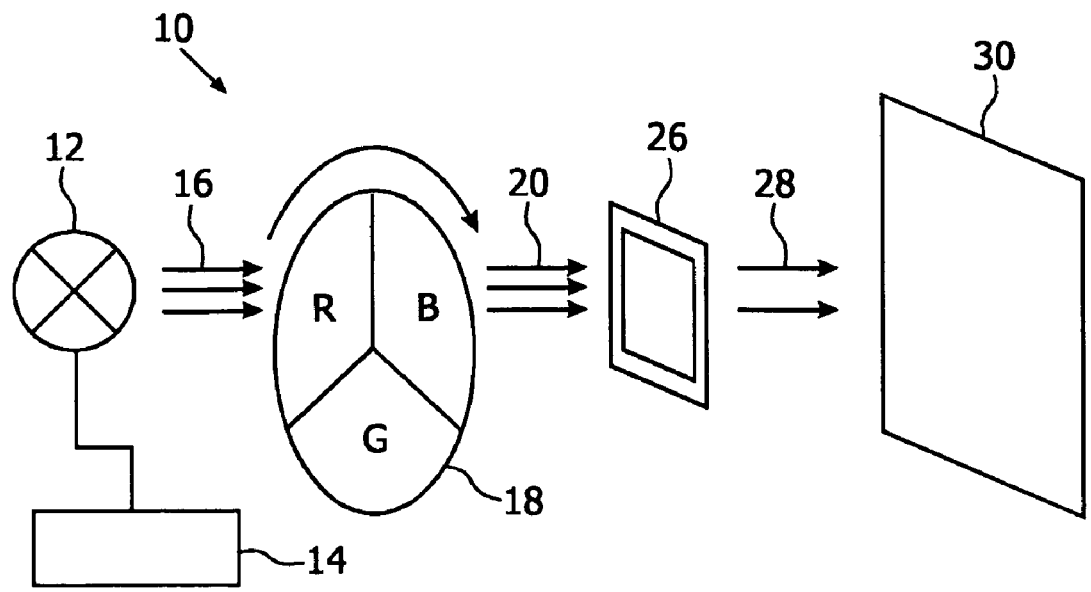
FIG. 1 shows a schematic view of a projection system.

In FIG. 1, an exemplary projection system 10 is shown. A lamp 12 driven by driver electronics 14 generates light 16. The spectral distribution of light 16 depends on the type of lamp 12, but will generally comprise all colors. This light 16 is color modulated by color wheel 18 acting as color filter means. Color wheel 18 shown in the example comprises sectors R, B, G with color filters for different colors (R=red, B=Blue, G=green). As color wheel 18 turns, a color modulated light sequence 20 is generated. It should be noted that in different embodiments the color wheel may comprise more than three sectors.

Figure 2:
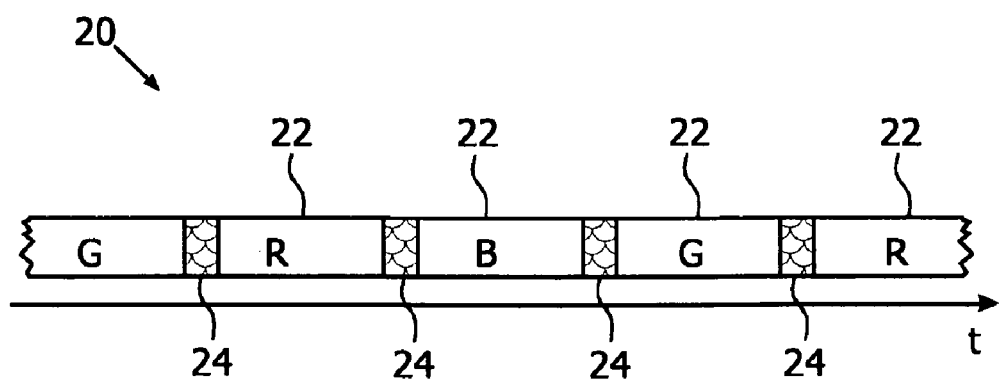
FIG. 2 shows a diagram schematically illustrating a light sequence.

FIG. 2 illustrates time modulated light sequence 20. Over time t, light sequence 20 comprises color time periods 22, where the light generated in light sequence 20 corresponds to originating light 16 being filtered with only one of sector color filters R, B, G of color wheel 18. Therefore, within color time periods 22, light 20 is of constant color.

Between color time periods 22, spoke time periods 24 are arranged. Spoke time periods 24 are intervals of time centered around the transition between sector color filters R, G, B of color wheel 18. Thus, within spoke time periods 24, the color of light 20 changes from the color of the preceeding color time interval 22 to that of the following color time period 22. Thus, the light within spoke time period 24 is of non-constant color.

It has to be noted that spoke time periods may more or less be arbitrarily defined between color time periods 22, but at least include the transition from one color to another. The duration of spoke time periods is preferably short, considerably shorter than color time periods, and will most preferably correspond to the minimum duration so that it can be ensured for the following and the proceeding color time periods 22 to be of constant color. The spoke time duration is thus dependent on the spot size of the light 16 on color wheel 18 in relation to the diameter of the color wheel. Generally it is preferred for each color time period to correspond to 10-40% of one half period of an alternating lamp current. The spoke time periods duration will be 1-6% of half period time. For the case of six color time periods per half period, the color time period duration are preferred to be 10-20% of one half period.

Back in FIG. 1, the color sequence light 20 is fed to a light valve 26, which may be of transmissive or reflective type. Known means of this type are DMD (digital mirror device) or LCD devices. These comprise individual pixels, which can be turned on or off, so that a light image 28 is generated, where individual pixels according to their on/off-state are present in the actual color of color light sequence 20 or not. This image 28 may be projected on a screen 30 or comparable device, where usually further optics devices are used which for the sake of simplicity are not shown here.

Figure 3:
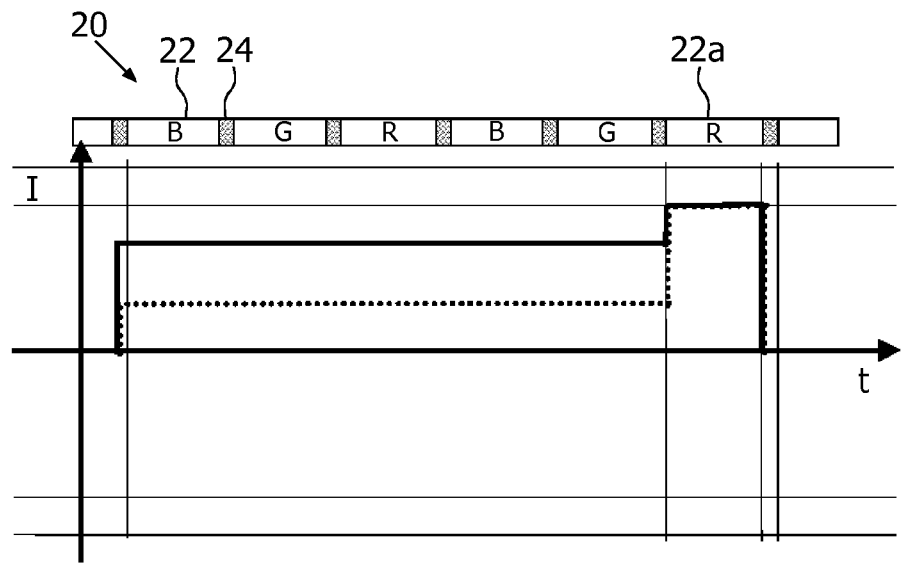
FIG. 3 shows a diagram of lamp current over time corresponding to prior art.

The discharge lamp 12 shown in FIG. 1 is, in the given example, driven by an alternating current supplied by driver electronics 14. FIG. 3 shows a diagram where the variation of lamp current I is shown over time t. FIG. 3 here shows only one half period of the alternating current for a projection system and method for operating a discharge lamp according to prior art like e.g. EP-A-1 154 652.

In the upper part of FIG. 3, color light sequence 20 with color time periods 22 and spoke time periods 24 is shown.

If we first consider the solid line in FIG. 3, it can be seen that the lamp 12 is driven with an alternating current I where the half periods are synchronized to revolutions of the color wheel 18. Within one half period, color wheel 18 turns twice. Thus, there are six full color time periods within one half period.

Figure 4:
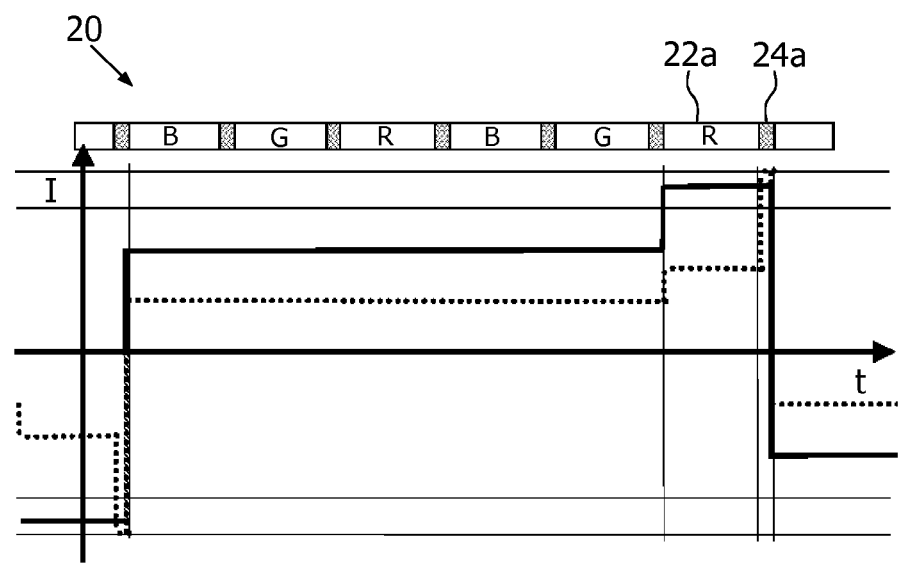
FIG. 4 shows a diagram of lamp current over time according to an embodiment of the invention.

It should be noted, that the curves shown in FIG. 3 and FIG. 4 are ideal, rectangular curves, which in a practical application may look somewhat different. Also, it should be noted that this rectangular shape, while preferred, is by no means the only possible wave form that may be used for the alternating current I.

Within the half period shown basic lamp current I is essentially constant. However, in the last color time period 22a, in this example corresponding to red light, a current pulse is superimposed on the constant basic lamp current I, such that current I shortly before polarity change is raised to a predetermined level.

This current pulse serves to stabilize the arc in lamp 12. In the example shown, the current pulse is synchronized to time color sequence 20 in a way such that the current pulse is active throughout one entire color time period 22a. It should be noted that alternatively the current pulse may be active for only a fixed fraction of the color time period 22a.

With regard to color balance of the system 10 driven in the way depicted in FIG. 3, it is clear that the current pulse during the color time period 22a will lead to an increased amount of red light. However, since this effect is known, it can be compensated or even employed to achieve a desired color balance of the complete system. For one, the spectral distribution of the light 16 may not be even, such that additional red light may compensate. Also, the size of sectors R, G, B of color wheel 18 may be adjusted to achieve a desired color balance.

While the solid line in FIG. 3 depicts the current in an early lifetime stage of lamp 12, the electrical properties of lamp 12 will change over lifetime. Due to electrode burn-back, the voltage increases. In order to achieve constant electrical power, driver electronics will accordingly reduce current I. This is shown in the dotted line in FIG. 3. Here, current I has been considerably reduced.

However, in order to still stabilize the arc, the current pulse during interval 22a is increased such that a constant current level is reached before the polarity change. This, however, leads to a significant change in the color balance, since the overall fraction of red light is much lager now than at the early lifetime stage.

FIG. 4 shows the lamp current I according to an embodiment of the present invention. Again, current I is plotted over time together with color light sequence 20. As in the above explained example of FIG. 3 basic lamp, current I is essentially constant throughout the half interval shown. During the last color time interval 22a before polarity change, a first current pulse is generated and superimposed on the basic lamp current I which lasts throughout color time period 22a. Immediately following color time period 22a is spoke time period 24a. During spoke time period 24a, a second current pulse is generated, such that current I is kept on the high level of the first current pulse until the polarity change.

As shown with the solid line, during the early stage of the lifetime of lamp 12, first and second current pulses are essentially equal in amplitude. However, the second current pulse starts significantly after the start of the first current pulse, and in the shown example even after the end of the first current pulse. The second current pulse has significantly shorter duration, corresponding to the shorter duration of spoke time 24a with regard to color time period 22a.

Now, as over lifetime of lamp 12 the electrical properties change, the basic lamp current I runs according to the dotted line in FIG. 4. As in the example of FIG. 3, the average current decreases. Thus, the current I in the first part of the half period is reduced accordingly.

The first current pulse is now chosen according to a fixed ratio with regard to the mean current (calculated by only taking the basic lamp current, without the current pulses). For example, first current pulse may be chosen such that its amplitude is always twice as high as that of the mean current. Since for most applications the light output of lamp 12 may be considered to be directly proportional to electrical power, this leads to the effect that the red light generated during color time period 22a will always be in a constant relationship to the light generated throughout the rest of the half period. Thus, there will be no color shift over lifetime due to the first current pulse.

If, for a specific application the relationship between electrical power and light generated is not directly proportional to the desired degree of precision, a lookup table may be used instead of a fixed ratio between mean current and first current pulse. In this case, a lookup table is determined in advance from the known lamp properties such that for each mean current value, a current pulse amplitude is given which yields a constant ratio in light output.

By contrast to the first current pulse, the amplitude of the second current pulse is chosen such that a fixed amplitude value, independent of the mean current and the first current pulse, is reached.

The second current pulse, generated during spoke time period 24a, is only active during this small time interval. However, as experiments have shown, even this short duration pulse plays an important role in stabilizing the arc. Arc stabilization by current pulses may be understood as additional electrode heating of the anode electrode before it becomes cathodic and has to emit electrons for the discharge. Therefore, the pulse has to supply a sufficient amount of energy at the very end of each half cycle. Here, the energy supplied very shortly before the polarity change has much greater influence than an equal amount of energy supplied over a longer time period. Therefore, the relatively short additional pulse still succeeds to achieve sufficient arc stabilization.

Instead of using a fixed amplitude value for the current in the spoke time interval, it is also possible to calculate, for different values of the first current pulse, values necessary for arc stabilization. These values may be used to build a lookup table to determine, at different stages of the lifetime of lamp 12, the necessary amplitude of the second current pulse.

In the following, some examples for possible values will be given. First, in the given example FIG. 4 with six color time periods 22 within one half period, the duration of one color time period may be approximately 14.67% of the total half period, and spoke times may be about 2% of the total half period. While these values may differ for different implementations, they show that color time periods are considerably longer than spoke time periods, preferably at least by a factor of 4 or more.

In a first preferred embodiment, the average lamp current I for a new lamp 12 may have a value of 2 A. Here, we look at the plateau current, i.e. the main current during the half period, without counting current pulses. The first current pulse amplitude is fixed at the same amplitude value as that of the plateau current amplitude (fixed factor=1), so that the first current pulse amplitude is 2 A and the total current during color time period 22a will be 4 A. The second pulse will be chosen such that a fixed total value of the current of 4 A is reached.

In the same example, with an older lamp, let us assume that the mean current has been reduced to 1 A. Because of the fixed ratio, the first current pulse will also be 1 A, leading to a total amplitude of 2 A during color time periods 22a. The total amplitude due to the second current pulse during spoke time period 24a remains fixed at 4 A, so that for the last 2% of the half cycle time, sufficient electrode heating for stable out operation is achieved.

According to a second preferred example, the fixed ratio between plateau current and first current pulse is 0.5. Assuming that for a new lamp the plateau current (mean current) I is 2.5 A, a first current pulse of 1.25 A leads to a total amplitude of 3.75 A for 13% of half cycle time. The second current pulse may be chosen, at this initial lifetime stage, to be equal to the first current pulse (1.25 A), so that a total amplitude during spoke time period 24a of 3.75 A is reached.

In the same example, after considerable lifetime of lamp 12 let us assume that the plateau current (mean current) is now reduced to 1 A. According to the fixed ratio, first current pulse is 0.5 A, leading to a total amplitude of 1.5 A. Further driver electronics 14 set the total amplitude during the second current pulse according to a value from an internal lookup table to be 4.25 A.

As can be seen from the second example, the amplitude during the second current pulse need not be fixed. In cases, where the first current pulse reaches a low value which only leads to reduced pre-heating of the electrodes, it may be advisable to increase the second current pulse in order to still maintain flutter-free operation.

However, in both cases it is clear that the color point, depending on the light output during color time intervals 22, 22a, will remain constant over lifetime.

Thus, the objective of achieving constant color point and light gain over the entire lamp life is achieved, while maintaining flutter free operation.

There are several modifications and supplements possible to the projection system 10 as described above.

On one hand, the light generated during the spoke time periods may be completely blocked by light valve 26 in order to obtain a correct color image. However, if increased brightness of the image is needed without regard to color, it is possible to use the light generated during the spoke times fully or in part to brighten the image. In this case, it is advantageous if the driver electronics 14 supply projection system control electronics with information about time, duration and amplitude of the second current pulse, so that it may be taken into account.

Another modification pertains to duration and amplitude of first and second pulse. These may be determined by the driver electronics 14 alone, as described above. However, it may also be possible for the projection control electronics to modify pulse settings via a special communications protocol, or even for the projection system control electronics to directly control generation of these pulses.

The invention claimed is:

1. Projection system including
   a discharge lamp,
   driving means for operating said lamp with a basic lamp current,
 wherein the basic lamp current is an alternating current; and
   color filter means for filtering light emitted from said lamp to generate a light sequence with different colors in sequential color time periods,
 wherein spoke time periods are arranged in between said color time periods,
 wherein said driving means provide
   first current pulses superimposed on said basic lamp current, where each of said first current pulses is generated during one of said color time periods, and
   second current pulses superimposed on said basic lamp current, each of said second current pulses being generated during one of said spoke time periods, and
 wherein the amplitude of said first current pulse is selected in relation to a mean current during one half period of said alternating current, said mean current being calculated without regard to the current pulses, such that the ratio of the light output due to said mean current and the light output due to said first current pulse is essentially constant.

2. System according to claim 1, wherein within said light sequence, during said color time periods, the light is of constant color, and within said spoke time periods the light is of non-constant color.

3. System according to claim 1, wherein said second current pulse starts after the start of said first current pulse.

4. System according to claim 1, wherein said second current pulse has a shorter duration than said first current pulse.

5. System according to claim 1, wherein the amplitude of said first current pulse is chosen according to an internal lookup table of said driving means to achieve a constant light ratio.

6. System according to claim 1, wherein the amplitude of said second current pulse is chosen such that the amplitude of the lamp current corresponds to an essentially fixed value.

* * * * *